United States Patent [19]

Motoda et al.

[11] Patent Number: 4,559,252
[45] Date of Patent: Dec. 17, 1985

[54] PLATE METAL REINFORCING COMBINATION

[75] Inventors: Masanori Motoda, Toyota; Atsunobu Fujikawa, Okazaki; Shigeki Shuzuki, Nagoya; Junpei Suzuki, Chiryu; Masahiro Nojima, Tokyo, all of Japan

[73] Assignees: Toyota Jidosha Kabushiki Kaisha; Nihon Tokushu Toryo Co., Ltd., both of Japan

[21] Appl. No.: 618,954

[22] Filed: Jun. 8, 1984

[30] Foreign Application Priority Data

Jun. 9, 1983 [JP] Japan .................. 58-103372
Jun. 9, 1983 [JP] Japan .................. 58-103373

[51] Int. Cl.$^4$ .................. B32B 27/12; B32B 11/00
[52] U.S. Cl. .................. 428/57; 156/275.1; 156/275.5; 156/304.1; 156/307.1; 156/308.4; 296/188; 428/217; 428/284; 428/286; 428/354; 428/489; 428/524
[58] Field of Search .................. 428/57, 31, 286, 284, 428/343, 344, 354, 489, 492, 524, 217; 296/188, 189; 156/304.1, 272.2, 275.5

[56] References Cited

U.S. PATENT DOCUMENTS 3,252,851  5/1966  Benson .................. 428/489
3,486,964  12/1969 Brunlid .................. 428/57
4,374,890  2/1983  Shimizu et al. .................. 428/354
4,378,395  3/1983  Asoshina et al. .................. 428/158
4,397,914  8/1983  Miura et al. .................. 296/188

Primary Examiner—Paul J. Thibodeau
Attorney, Agent, or Firm—Finnegan, Henderson, Farabow, Garrett & Dunner

[57] ABSTRACT

A reinforcing combination is useful to reinforce plate metal which comprises a pressure-sensitive adhesive sheet formed from a sheet-like substrate comprising asphalt, rubber, and a filler and having a pressure-sensitive adhesive layer on one surface thereof; and a thermosetting sheet formed from a sheet-like substrate comprising polyvinyl acetal, monomeric diallyl phthalate, a filler, and at least one additive, and having a reinforcing fiber layer on one surface and a pressure-sensitive adhesive layer on the other surface thereof; wherein said thermosetting sheet at one edge partially overlaps said pressure-sensitive adhesive sheet with the pressure-sensitive adhesive layer of the former in contact with that surface of the latter which is remote from its own pressure-sensitive adhesive layer. A reinforcement configuration is provided by attaching the components of the reinforcing combination in assembly or separately followed by heat curing. Combination of two different types of sheets is effective to provide both reinforcing and vibration damping effects.

9 Claims, 3 Drawing Figures

PLATE METAL REINFORCING COMBINATION

BACKGROUND OF THE INVENTION

This invention relates to a reinforcing combination or assembly for use with plate metal such as automobile door panels, and a reinforcement configuration resulting from such a reinforcing assembly attached to plate metal.

It is well known in the automobile art that great efforts have recently been made to reduce the weight of vehicle bodies for the purpose of improving fuel consumption. Steel plates from which vehicle bodies are fabricated are then required to be as thin as possible. With such a reduction in thickness of body-forming steel plates, there have newly arisen problems that they are readily dented under local external forces and that vibration is increased to generate more noise.

One prior art method for solving such problems is to attach a thermosetting sheet of epoxy or butyl type to the inner surface of a body panel followed by heat curing of the sheet. The use of thermosetting sheets of epoxy and butyl types for reinforcement is successful in increasing the rigidity of panels at the sacrifice of the production cost of automobiles because these thermosetting sheets are relatively expensive. Further, automobile body panels for use as automobile bodies are not required to have high tensile rigidity, dent resistance and vibration damping properties over the entire area, but are required to have different properties for different areas. If a thermosetting sheet is attached to the entire area of the panel, rigidity is locally increased to an unnecessarily high level or conversely, certain properties are locally lower than the required level. As a result, expenditure is lost in vain to raise manufacturing cost. In addition, the body weight is correspondingly increased against the principal purpose of reducing the thickness of body-forming steel plates. The above-mentioned conventional reinforcing material in the form of an adhesive sheet, once attached to a body panel, is difficult to separate from the panel. Even when separable, the reinforcing material is imperatively broken in separating it from the panel. The conventional reinforcing material must be carefully and precisely attached to the panel so that attaching operation is time consuming and requires a skill. Furthermore, the conventional thermosetting sheets tend to cause the panel to be strained or warped because of their increased percentage shrinkage and shrinkage stress upon curing.

In order to overcome the problems associated with the shrinkage of such reinforcing sheets, Japanese Patent Application Kokai No. SHO 52-1507 proposes to use the reinforcing sheet in segments. Attaching a number of reinforcing sheet segments is time consuming and cumbersome and is not acceptable in practice.

A further method for reinforcing panels is disclosed in Japanese Patent Application Kokai No. SHO 57-151316 in which a resinous material containing a foaming agent is completely covered with a thermosetting resin and they are heat cured to form a tunnel-like reinforcing rib. The reinforcing material disclosed in this patent application is successful in weight reduction due to the use of the foaming agent and in avoiding the occurrence of strain and warpage, but it cannot fully damp vibration.

SUMMARY OF THE INVENTION

It is, therefore, an object of the present invention to provide a novel, inexpensive reinforcing assembly for use with plate metal, which exhibits improved reinforcement and vibration damping and is easy to attach to the plate metal.

It is another object of the present invention to provide a reinforcement configuration capable of reinforcing plate metal by attaching and heat curing a reinforcing assembly to the metal plate.

According to a first aspect of the present invention, there is provided a reinforcing assembly for use with plate metal comprising a pressure-sensitive adhesive sheet formed from a sheet-like substrate comprising asphalt, rubber, and a filler and having a pressure-sensitive adhesive layer on one surface thereof, and a thermosetting sheet formed from a sheet-like substrate comprising polyvinyl acetal, monomeric diallyl phthalate, a filler, and at least one additive, and having a reinforcing fiber layer on one surface and a pressure-sensitive adhesive layer on the other surface thereof, wherein said thermosetting sheet at one edge partially overlaps said pressure-sensitive adhesive sheet with the pressure-sensitive adhesive layer of the former in contact with that surface of the latter which is remote from its own pressure-sensitive adhesive layer.

According to a second aspect of the present invention, there is provided a reinforcement configuration for use with plate metal, which is prepared by a process comprising the steps of attaching a pressure-sensitive adhesive sheet to a desired site of a metal plate to be reinforced, said pressure-sensitive adhesive sheet being formed from a sheet-like substrate comprising asphalt, rubber, and a filler and having a pressure-sensitive adhesive layer on one surface thereof, attaching a thermosetting sheet to the metal plate such that the thermosetting sheet along its edge partially overlaps said pressure-sensitive adhesive sheet, said thermosetting sheet being formed from a sheet-like substrate comprising polyvinyl acetal, monomeric diallyl phthalate, a filler, and at least one additive, and having a reinforcing fiber layer on one surface and a pressure-sensitive adhesive layer on the other surface thereof, with the pressure-sensitive adhesive layer of the thermosetting sheet being in contact with that surface of the pressure-sensitive adhesive sheet which is remoted from its own pressure-sensitive adhesive layer, and heating both said pressure-sensitive adhesive sheet and said thermosetting sheet until cured.

Since the pressure-sensitive adhesive sheet is flexible, the thermosetting sheet is hard, and these sheets partially overlap each other to form an integral assembly, the reinforcing assembly and the reinforcement configuration of the present invention can provide improved reinforcing effect and vibration damping effect at the same time. The reinforcing assembly according to the present invention can be easily separated from the plate metal as long as it has not been heat cured, and attached to the plate metal again, eliminating the need for skillful operation. Since the pressure-sensitive adhesive sheet which is one of the components of the reinforcing assembly according to the invention is principally based on asphalt, the reinforcing assembly is relatively less costly. Reinforced products are thus available at low manufacture cost.

BRIEF DESCRIPTION OF THE DRAWINGS

The above and other objects, features, and advantages of the present invention will be more fully understood from the following description when taken in conjunction with the accompanying drawings, in which.

DESCRIPTION OF THE PREFERRED EMBODIMENTS

Figure 1:
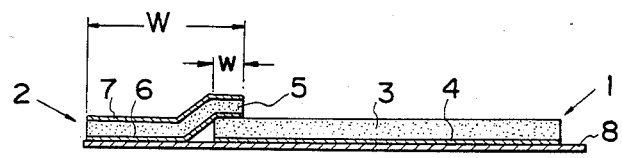
FIG. 1 is a cross-sectional view of one embodiment of the reinforcing assembly according to the present invention.

The reinforcing assembly of the present invention will be first described with reference to FIG. 1. The reinforcing assembly is shown in FIG. 1 as comprising a pressure-sensitive adhesive sheet 1 and a thermosetting sheet 2 partially overlapping the former sheet.

Among these two component sheets of the reinforcing assembly, the pressure-sensitive adhesive sheet 1 is formed of a sheet-like substrate 3 having a pressure-sensitive adhesive layer 4 applied onto one surface thereof. The substrate 3 is formed from a composition comprising an alphalt, a rubber, and a filler, as by rolling it into a sheet. The asphalt which can be used herein may be any one of natural asphalt, asphaltite, straight asphalt, blown asphalt and the like, alone or in admixture of two or more of them. The type of the rubber which can be used herein is not particularly limited because freeze resistance, heat resistance, oil resistance and other properties are not strictly needed in view of the destined application purpose. However, styrene-butadiene rubbers and regenerated rubbers are particularly preferred because of their cost.

The asphalt and rubber are blended such that about 20 to about 60 parts by weight of rubber is present per 100 parts by weight of asphalt. When the amount of rubber is less than about 20 parts by weight, the resulting pressure-sensitive adhesive sheet will sag off when attached to a vertical wall and heated and be insufficient in vibration damping. Contents of rubber in excess of 60 parts by weight will extremely increase rubber elasticity, also detracting from vibration damping effect.

The filler which is blended with the asphalt and rubber may be selected from materials which have been generally used as vibration damping materials in the prior art. More illustratively, the fillers include fibrous fillers such as asbestos, ceramic fibers, glass fibers, metallic fibers, organic fibers, ground waste paper, ground waste synthetic fibers, etc.; flake fillers such as mica; particulate fillers such as talc, barium sulfate, clay, calcium carbonate, magnesium carbonate, silica, sand, mica powder, etc.; and quick lime, colorants, and ground industrial wastes. Among these, most preferred are inorganic fibrous fillers, flake fillers and particulate fillers having a high specific gravity.

The filler is blended in such a proportion that about 100 to 400 parts by weight of the filler is present per 100 parts by weight of asphalt. With amounts of the filler blended of less than 100 parts by weight, the resulting compositions suffer from sagging off and shrinkage upon heating and become insufficient in vibration damping whereas more than 400 parts by weight of the filler inconveniently reduces vibration damping ability.

The pressure-sensitive adhesive sheet 1 may preferably be prepared by blending the above-mentioned asphalt, rubber, and filler in the above-defined proportion, milling and kneading the mixture in a mixing mill or similar mills, and shaping the mixture into a sheet-like substrate 3 by rolling, extrusion molding or any desired molding technique. A pressure-sensitive adhesive is then applied to one surface of the sheet-like substrate 3 to form an adhesive layer 4. The pressure-sensitive adhesive which can be used herein may be selected from well-known pressure-sensitive adhesive compositions comprising acrylic or other synthetic resins, synthetic rubbers, gums, petroleum resins, and solvents. The adhesive may be applied to the sheet-like substrate 3 by any desired technique including spray coating, roll coating, flow coating and the like.

Next, the thermosetting sheet 2 will be described. Like the pressure-sensitive adhesive sheet 1 mentioned above, the thermosetting sheet 2 comprises a sheet-like substrate 5 having a pressure-sensitive adhesive layer 6 on one surface thereof. The difference is that the sheet-like substrate 5 of the thermosetting sheet 2 is formed of a composition comprising a polyvinyl acetal, monomeric diallyl phthalate, a filler, and at least one additive and provided with a reinforcing fiber layer 7 on the other surface thereof.

The polyvinyl acetal which is one of the components of the sheet-like substrate 5 functions as a binder and is preferably polyvinyl butyral. As is well known, the polyvinyl butyral is a thermoplastic resin which is prepared by reacting polyvinyl alcohol with butyl aldehyde and thus contains hydroxyl groups and a minor proportion of acetyl groups in its molecule so that it forms crosslinkages in admixture with a thermosetting resin monomer or through a heat treatment. Polyvinyl butyrals generally have a degree of polymerization of about 100 to 2,000 and a softening point of about 60° to 140° C., with polyvinyl butyrals having a degree of polymerization of about 100 to 1,000 and a softening point of about 65° to 100° C. being preferred for the present invention.

The monomeric diallyl phthalate which is blended with the polyvinyl acetal is a diallyl ester of orthophthalic acid and isophthalic acid and thus contains two double bonds per molecule so that it readily reacts with polyvinyl acetal under the influence of catalysts or heat to form a thermosetting resin having improved electrical properties, size stability, heat resistance and chemical resistance.

The polyvinyl acetal and monomeric diallyl phthalate are blended such that about 50 to 250 parts by weight of monomeric diallyl phthalate is present per 100 parts by weight of polyvinyl acetal. If the monomeric diallyl phthalate is present in an amount of less than about 50 parts by weight, insufficient reaction with polyvinyl acetal takes place to provide poor rigidity reinforcing effect. With amounts of the monomeric diallyl phthalate of more than about 250 parts by weight, an excess of diallyl phthalate might exudate on the surface of a sheet formed from the resulting composition or warpage or separation occurs in the sheet.

The filler used in the composition of the thermosetting sheet 2 may be the same or different from that used in the pressure-sensitive adhesive sheet 1 and selected from the group mentioned for the pressure-sensitive adhesive sheet 1. More illustratively, the fillers may include fibrous fillers such as asbestos, glass fibers, ground waste paper, ground waste synthetic fibers, etc.; flake fillers such as mica; particulate fillers such as talc, barium sulfate, clay, calcium carbonate, magnesium carbonate, silica, sand, mica powder, etc.; and quick lime, colorants, and ground industrial wastes. Among these, most preferred are inorganic fibrous fillers, flake fillers and particulate fillers having a high specific gravity. The filler is blended such that about 400 to 1,000 parts by weight of the filler is present per 100 parts by weight of the polyvinyl acetal. Less than about 400 parts by weight of the filler does not impart sufficient rigidity or reinforcement to the composition. Conversely, more than about 1,000 parts by weight of the filler results in a composition which tends to crack under impact.

The composition from which the substrate 5 of the thermosetting sheet 2 is formed may further contain at least one additive, for example, polymerization initiators and foaming agents. The initiators may be conventional organic peroxides. Any desired initiator may be selected, depending on heating temperature conditions, from t-butyl peroxybenzoate, benzoyl peroxide, methyl ethyl ketone peroxide, t-butyl peroctoate, etc. Examples of the foaming agent are azodicarbonamide, benzenesulfonyl hydrazide, p-toluene sulfonamide hydrazide, etc.

The sheet-like substrate 5 may be prepared by blending the polyvinyl acetal, monomeric diallyl phthalate, filler, and additives mentioned above, rolling the mixture into a sheet. During or after rolling into a sheet, a reinforcing fiber layer 7 is formed on one surface of the sheet. The reinforcing fiber layer 7 functions to enhance the reinforcement to be imparted to plate metal and to prevent peeling off of the thermosetting sheet which has cracked. The fiber layer 7 may be formed of glass cloth, long carbon fibers and the like. Blending of the polyvinyl acetal, monomeric diallyl phthalate and other components is carried out by first adding powdery polyvinyl acetal to liquid monomeric diallyl phthalate and mixing them at temperatures of 40° to 50° C. to form a paste. The filler is then incorporated into the paste. When two or more of the fibrous filler, quick lime, flake filler, and particulate filler are used, they are added to the matrix in this order. The mixture is fully kneaded in a mill and a polymerization initiator is finally added. Milling is preferably carried out such that the temperature of the milled mixture may not exceed 50° C.

The thus obtained sheet-like substrate 5 is then formed with a pressure-sensitive adhesive layer 6 on that surface which is remote from the reinforcing fiber layer 7, completing the thermosetting sheet 2. The pressure-sensitive adhesive layer 6 may be formed by applying any one of the adhesives previously mentioned for the pressure-sensitive adhesive sheet 1 by a technique similar to those previously mentioned. That is, the pressure-sensitive adhesive may be selected from well-known pressure-sensitive adhesive compositions comprising acrylic or other synthetic resins, synthetic rubbers, gums, petroleum resins, and solvents. The adhesive may be applied to the sheet-like substrate 5 by any desired technique including spray coating, roll coating, flow coating and the like.

The reinforcing assembly of the present invention is obtained by partially overlapping the thermosetting sheet 2 on the pressure-sensitive adhesive sheet 1 and integrating them. As clearly shown in FIG. 1, one edge portion of the thermosetting sheet 2 is placed on that surface of the pressure-sensitive adhesive sheet 1 which is remote from the pressure-sensitive adhesive layer 4, thereby forming an assembly. A release paper 8 is attached to the pressure-sensitive adhesive layers 4 and 6 of the sheets 1 and 2 in assembly. The distance w of overlap between the sheets 1 and 2 is preferably less than a quarter of the entire width W of the thermosetting sheet 2. If the sheets overlap over a distance of more than a quarter of the entire width W of the thermosetting sheet 2, the resulting assembly becomes substantially a vibration damping two-layer structure which is impractical because it provides insufficient rigidity enhancement when attached to plate metal and exerts the maximum vibration damping effect at undesirably shifted temperatures and frequencies.

Figure 2:
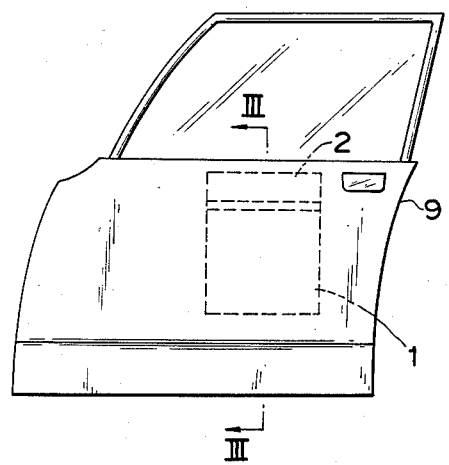
FIG. 2 is an elevation of an automobile door outer panel having the reinforcement configuration attached thereto according to the present invention.
Figure 3:
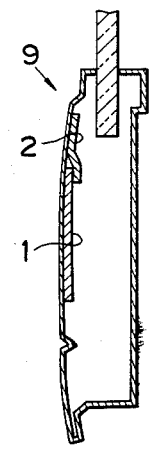
FIG. 3 is an enlarged cross-sectional view of the reinforcement configuration taken along lines III—III in FIG. 2.

Next, the reinforcement configuration according to the present invention is described. The reinforcement configuration is fabricated by partially overlapping the thermosetting sheet 2 over the pressure-sensitive adhesive sheet 1 to form an assembly, attaching the assembly to the desired site of a metal plate to be reinforced, and heating the assembly for curing. Alternatively, the thermosetting sheet 2 and the pressure-sensitive adhesive sheet 1 may be separately attached to the desired site of a metal plate in a mutually partially overlapping manner. When the reinforcing assembly of the pressure-sensitive adhesive sheet and the thermosetting sheet is used, the release paper 8 is removed before the assembly is attached to the desired site of a metal plate, for example, a door outer panel 9 of an automobile body as shown in FIGS. 2 and 3. When the pressure-sensitive adhesive sheet 1 and the thermosetting sheet 2 are prepared separately, they are cut to a desired size. A piece of the pressure-sensitive adhesive sheet 1 is first attached to the desired site of a door outer panel 9 and a piece of the thermosetting sheet 2 is then attached to the door panel so as to partially overlap the previously attached piece of the pressure-sensitive adhesive sheet 1. The overlapping distance is preferably less than a quarter of the entire width of the thermosetting sheet piece 2 as previously described. Such attachement is carried out through a narrow service hole at the back of a door unit. According to the present invention, the sheets 1 and 2 of the reinforcing assembly are removably attached to a door outer panel through the pressure-sensitive adhesive layers 4 and 6 on one surface thereof before they are cured to the panel by heating. This process permits the sheets to be removed and reattached before heating. Therefore, the attachement does not require a particularly careful or skillful operation, with the benefit of ease of manufacture.

After the sheets have been adequately attached to the panel, the sheets 1 and 2, more particularly their substrates 3 and 5 are cured by heating. When an object to be reinforced is an automobile body member, heating may be concomitantly achieved by the baking of paint applied to the outside surface of the member. Differently stated, the sheets 1 and 2 can be cured to an acceptable hardness at temperatures of about 120° to 160° C. normally employed for baking paint. The cured sheets 1 and 2 preferably have a ratio of their hardnesses such that provided that the hardness of the substrate 3 of the cured pressure-sensitive adhesive sheet 1 is unity, the hardness of the substrate 5 of the thermoset sheet 2 ranges from 1.2 to 2.5. Outside this hardness ratio range, reinforcing effect is achieved at the sacrifice of vibration damping effect and vice verse. The hardness ratio used herein is based on measurements by an A type hardness tester according to JIS K6301. Actually, the substrate 3 of the pressure-sensitive adhesive sheet 1 has a hardness in the range between about 40 and 80 and the substrate 5 of the thermosetting sheet 2 has a hardness in the range between about 80 and 100 both after being cured.

By curing the sheets 1 and 2 to a door outer panel to provide a hardness ratio in the above specified range while partially overlapping them each other so as to form an integral assembly, the door outer panel is greatly reinforced with the assembly with respect to tensile rigidity, dent resistance and vibration damping properties.

Examples of the reinforcing assembly and reinforcement configuration according to the present invention will be presented by way of illustration and not by way of limitation, together with comparative examples. All parts and percents are based on weight.

EXAMPLE I

A mixture of 100 parts of a blown asphalt having a penetration of 10–20 and a softening point of 90°–100° C., 35 parts of a styrene-butadiene rubber, 100 parts of talc, 11 parts of process oil, and 50 parts of asbestos was milled in a mixing roll mill. The milled mixture was extruded through an extruder and then rolled through calender rolls into a sheet of 1.5 mm thick. Using a roll coater, an adhesive composition of 15 parts of a styrene-butadiene rubber, 19.5 parts of petroleum resin, 65 parts of toluol, and 0.5 parts of an antioxidant was applied to one surface of the sheet, yielding a pressure-sensitive adhesive sheet.

In a separate batch, 100 parts of a polyvinyl butyral (manufactured by Sekisui Chemical K.K., trade name BL-2) was added to 150 parts of a monomeric diallyl phthalate (manufactured by Osaka Soda K.K., trade name DAP Monomer) and agitated at an elevated temperature of 45° C. To this mixture were added and agitated 80 parts of asbestos (manufactured by Lake Asbestos Company, Canada, trade name Asbestos 7T-5) and 30 parts of quick lime. The mixture was then transferred to a mixing roll mill where 100 parts of mica powder (manufactured by Takara Industry K.K., trade name M-30) and 585 parts of barium sulfate were sequentially and carefully introduced into the mixture so that the temperature of the mixture might not exceed 50° C. Finally, 5 parts of t-butyl peroxybenzoate was added and the resulting mixture was rolled into a sheet of 2 mm thick. A glass cloth was adhered to one surface of the sheet and an adhesive composition similar to that used for the pressure-sensitive adhesive sheet was applied to the other surface, yielding a thermosetting sheet.

The thus obtained pressure-sensitive adhesive sheet and thermosetting sheet were cut to pieces sized 60 mm × 14 mm. A thermosetting sheet piece along its long side edge was overlapped on a pressure-sensitive adhesive sheet piece along its long side edge over a distance of 3 mm to form an integral assembly, that is, a reinforcing assembly according to the present invention.

To evaluate the reinforcing effect of the reinforcing assembly, it was attached to a painted steel plate of 60 mm × 25 mm × 0.8 mm thick and baked at 150° C. for 30 minutes to form a test specimen. At the end of heating, the pressure-sensitive adhesive sheet had a hardness of 62 and the thermoset sheet had a hardness of 90.

Additionally, to evaluate the vibration damping effect of the reinforcing assembly, both the above-prepared sheets were cut to pieces of 20 mm × 120 mm. A thermosetting sheet piece along its short side edge was overlapped on a pressure-sensitive adhesive sheet piece along its short side edge over a distance of 20 mm to form an integral assembly. The assembly was then attached to a steel plate of 220 mm × 20 mm × 0.8 mm thick so as to leave an exposed steel surface area of 20 mm wide and baked at 150° C. for 30 minutes to form a reinforced specimen for the evaluation of vibration damping effect.

COMPARATIVE EXAMPLE

This example also used the same sheets as the pressure-sensitive adhesive sheet and the thermosetting sheet used in Example I.

For the purpose of comparing reinforcing effect, pieces of 60 mm × 10 mm of both the sheets were attached to a painted steel plate of 60 mm × 25 mm × 0.8 mm thick with a spacing of 5 mm between the sheet pieces without mutual overlapping. Baking was carried out at 150° C. for 30 minutes to form a test specimen.

For the purpose of comparing vibration damping effect, both the sheets were cut to pieces of 20 mm × 95 mm. A thermosetting sheet piece was attached to a steel plate such that one edge of the former was in register with one edge of the latter. Then a pressure-sensitive adhesive sheet piece was attached to the steel plate with a spacing of 10 mm from the thermosetting sheet piece. Baking was carried out at 150° C. for 30 minutes, obtaining a specimen for the measurement of vibration damping properties.

Procedure and Results of Measurement

1. Steel Plate Reinforcing Effect

A specimen was rested on supports having a span of 40 mm with the reinforcing assembly faced down. A load was applied to the specimen at its center on the exposed steel surface, that is, from above at a compression rate of 1 mm per minute. The load required to deform the specimen or steel plate over a distance of 7 mm was recorded. Measurements obtained for ten (10) specimens were averaged. The results are shown below.

| Example I | 14.8 kg |
|---|---|
| Comparative Example | 10.3 kg |
| Steel plate alone | 6.2 kg |

2. Vibration Damping Effect

Using reinforced plates and test specimens for the evaluation of vibration damping effect as fabricated above, the vibration damping effect (loss factor $\eta$) was measured under measuring conditions at about 25° C. according to Ohbest II method. Measurements obtained for ten (10) specimens were averaged. The results are shown below. A loss factor $\eta$ of 0.05 or higher is regarded as being effective in damping vibration.

| Example I | 0.23 |
|---|---|
| Comparative Example | 0.09 |

Several examples of the present invention are described below, in which the size and overlapping distance of pressure-sensitive adhesive and thermosetting sheets, and heating or baking conditions after attachment are the same as in Example I as well as the methods for the evaluation of reinforcing and vibration damping effects.

EXAMPLE II

A pressure-sensitive adhesive sheet prepared had the following composition.

|  |  | Parts by weight |
|---|---|---|
| Substrate |  |  |
| Asphalt: | Blown asphalt | 100 |
| Rubber: | Styrene-butadiene rubber | 20 |
| Filler: | Talc | 115 |
|  | Asbestos | 50 |
|  | Process oil | 11 |
| Pressure-sensitive adhesive: |  |  |
|  | Styrene butadiene rubber | 15 |
|  | Petroleum resin | 19.5 |
|  | Toluol | 65 |
|  | Antioxidant | 0.5 |

A thermosetting sheet prepared had the following composition.

|  | Parts by weight |
|---|---|
| Substrate |  |
| Polyvinyl butyral | 100 |
| Diallyl phthalate monomer | 200 |
| Filler: Asbestos | 80 |
| Quick lime | 30 |
| Barium sulfate | 600 |
| Mica powder | 100 |
| Initiator: t-butyl peroxybenzoate | 5 |
| Reinforcing fiber layer: glass cloth |  |
| Pressure-sensitive adhesive: same as used for the pressure sensitive adhesive sheet |  |

EXAMPLE III

A pressure-sensitive adhesive sheet prepared had the following composition.

|  |  | Parts by weight |
|---|---|---|
| Substrate |  |  |
| Asphalt: | Blown asphalt | 150 |
| Rubber: | Styrene-butadiene rubber | 35 |
| Filler: | Talc | 100 |
|  | Asbestos | 50 |
|  | Process oil | 11 |
| Pressure-sensitive adhesive: |  |  |
|  | Styrene butadiene rubber | 15 |
|  | Petroleum resin | 19.5 |
|  | Toluol | 65 |
|  | Antioxidant | 0.5 |

A thermosetting sheet prepared had the following composition.

|  | Parts by weight |
|---|---|
| Substrate |  |
| Polyvinyl butyral | 50 |
| Diallyl phthalate monomer | 100 |
| Filler: Asbestos | 80 |
| Quick lime | 30 |
| Barium sulfate | 600 |
| Mica powder | 100 |
| Initiator: t-butyl peroxybenzoate | 5 |
| Reinforcing fiber layer: glass cloth |  |
| Pressure-sensitive adhesive: same as used for the pressure sensitive adhesive sheet |  |

EXAMPLE IV

A pressure-sensitive adhesive sheet prepared had the following composition.

|  |  | Parts by weight |
|---|---|---|
| Substrate |  |  |
| Asphalt: | Blown asphalt | 100 |
| Rubber: | Sryrene-butadiene rubber | 35 |
| Filler: | Talc | 100 |
|  | Asbestos | 50 |
|  | Mica powder | 30 |
|  | Process oil | 11 |
| Pressure-sensitive adhesive: |  |  |
|  | Acrylic adhesive | 100 |
|  | Moisture-curable isocyanate | 1.5 |

A thermosetting sheet prepared had the following composition.

|  | Parts by weight |
|---|---|
| Substrate |  |
| Polyvinyl butyral | 100 |
| Diallyl phthalate monomer | 100 |
| Filler: Asbestos | 80 |
| Quick lime | 30 |
| Barium sulfate | 585 |
| Mica powder | 100 |
| Initiator: t-butyl peroxybenzoate | 5 |
| Reinforcing fiber layer: glass cloth |  |
| Pressure-sensitive adhesive: same as used for the pressure sensitive adhesive sheet |  |

EXAMPLE V

A pressure-sensitive adhesive sheet prepared had the following composition.

|  |  | Parts by weight |
|---|---|---|
| Substrate |  |  |
| Asphalt: | Blown asphalt | 50 |
|  | Straight asphalt | 50 |
| Rubber: | Styrene-butadiene rubber | 35 |
| Filler: | Talc | 100 |
|  | Asbestos | 50 |
|  | Process oil | 11 |
| Pressure-sensitive adhesive: |  |  |
|  | Acrylic adhesive | 100 |
|  | Moisture-curable isocyanate | 1.5 |

A thermosetting sheet prepared had the following composition.

|  | Parts by weight |
|---|---|
| Substrate |  |
| Polyvinyl butyral | 100 |
| Diallyl phthalate monomer | 100 |
| Filler: Asbestos | 80 |
| Quick lime | 30 |
| Barium sulfate | 600 |
| Mica powder | 100 |
| Initiator: t-butyl peroxybenzoate | 5 |
| Foaming agent: Cellmike CAP-500* | 3 |
| Reinforcing fiber layer: glass cloth |  |

-continued

| | Parts by weight |
|---|---|
| Pressure-sensitive adhesive: same as used for the pressure sensitive adhesive sheet | |

*manufactured and sold by Sankyo Chemicals K.K., Japan

The results of steel plate reinforcing and vibration damping effects obtained in Examples II to V are shown in Table 1.

TABLE 1

| | Reinforcing effect (kg/7 mm) | Vibration damping (loss factor) |
|---|---|---|
| Example II | 13.9 | 0.25 |
| Example III | 15.2 | 0.25 |
| Example IV | 14.6 | 0.22 |
| Example V | 14.0 | 0.21 |

The results shown in Table 1 prove that the reinforcing assembly and reinforcement configuration according to the present invention provide improved reinforcing and vibration damping effects.

As apparent from the foregoing, the reinforcing assembly and reinforcement configuration according to the present invention attain improved reinforcing effect including tensile rigidity and dent resistance and at the same time, provide improved vibration damping effect. Since the pressure-sensitive adhesive sheet and the thermosetting sheet are removably attached (or repeatedly adhered and removed) to a metal plate prior to heat curing, attaching operation is relatively easy even when an available service space is relatively narrow as in the case of the back side of automobile door outer panels. Since the reinforcing assembly of the present invention comprises two different types of sheets one of which is a pressure-sensitive adhesive sheet based on asphalt and having improved vibration damping properties, a remarkable reinforcing effect is obtained along with a sufficient vibration damping effect at low cost.

What is claimed is:

1. A reinforcing assembly for use with plate metal comprising
   a pressure-sensitive adhesive sheet formed from a sheet-like substrate comprising asphalt, rubber, and a filler and having a pressure-sensitive adhesive layer on one surface thereof, and
   a thermosetting sheet formed from a sheet-like substrate comprising polyvinyl acetal, monomeric diallyl phthalate, a filler, and at least one additive, and having a reinforcing fiber layer on one surface and a pressure-sensitive adhesive layer on the other surface thereof,
   wherein said thermosetting sheet at one edge partially overlaps said pressure-sensitive adhesive sheet with the pressure-sensitive adhesive layer of the former in contact with that surface of the latter which is remote from its own pressure-sensitive adhesive layer.

2. The reinforcing assembly according to claim 1 wherein the substrate of said pressure-sensitive adhesive sheet comprises about 20 to 60 parts by weight of rubber and about 100 to 400 parts by weight of the filler per 100 parts by weight of asphalt.

3. The reinforcing assembly according to claim 1 wherein the substrate of said thermosetting sheet comprises about 50 to 250 parts by weight of monomeric diallyl phthalate and about 400 to 1,000 parts by weight of the filler per 100 parts by weight of polyvinyl acetal.

4. The reinforcing assembly according to claim 1 wherein said thermosetting sheet overlaps said pressure-sensitive adhesive sheet over a distance of not more than a quarter of the entire width of said thermosetting sheet.

5. A reinforcement configuration for use with plate metal, which is prepared by a process comprising the steps of
   attaching a pressure-sensitive adhesive sheet to a desired site of a metal plate to be reinforced, said pressure-sensitive adhesive sheet being formed from a sheet-like substrate comprising asphalt, rubber, and a filler and having a pressure-sensitive adhesive layer on one surface thereof,
   attaching a thermosetting sheet to the metal plate such that the thermosetting sheet along its edge partially overlaps said pressure-sensitive adhesive sheet, said thermosetting sheet being formed from a sheet-like substrate comprising polyvinyl acetal, monomeric diallyl phthalate, a filler, and at least one additive, and having a reinforcing fiber layer on one surface and a pressure-sensitive adhesive layer on the other surface thereof, with the pressure-sensitive adhesive layer of the thermosetting sheet being in contact with that surface of the pressure-sensitive adhesive sheet which is remote from its own pressure-sensitive adhesive layer, and
   heating both said pressure-sensitive adhesive sheet and said thermosetting sheet until cured.

6. The reinforcement configuration according to claim 5 wherein the substrate of said pressure-sensitive adhesive sheet comprises about 20 to 60 parts by weight of rubber and about 100 to 400 parts by weight of the filler per 100 parts by weight of asphalt.

7. The reinforcement configuration according to claim 5 wherein the substrate of said thermosetting sheet comprises about 50 to 250 parts by weight of monomeric diallyl phthalate and about 400 to 1,000 parts by weight of the filler per 100 parts by weight of polyvinyl acetal.

8. The reinforcement configuration according to claim 5 wherein said thermosetting sheet overlaps said pressure-sensitive adhesive sheet over a distance of not more than a quarter of the entire width of said thermosetting sheet.

9. The reinforcement configuration according to claim 5 wherein after heat curing, said pressure-sensitive adhesive sheet and said thermosetting sheet have a ratio of their hardnesses in the range between 1:1.2 and 1:2.5.

* * * * *